3,565,827
PREPARATION OF ACTIVATED CARBON IN
SERIALLY DISPOSED FLUIDIZED ZONES
John R. Friday, Ponca City, Okla., assignor to Continental Oil Company, Ponca City, Okla., a corporation of Delaware
Filed Mar. 29, 1968, Ser. No. 717,148
Int. Cl. C01b *31/08*
U.S. Cl. 252—445
5 Claims

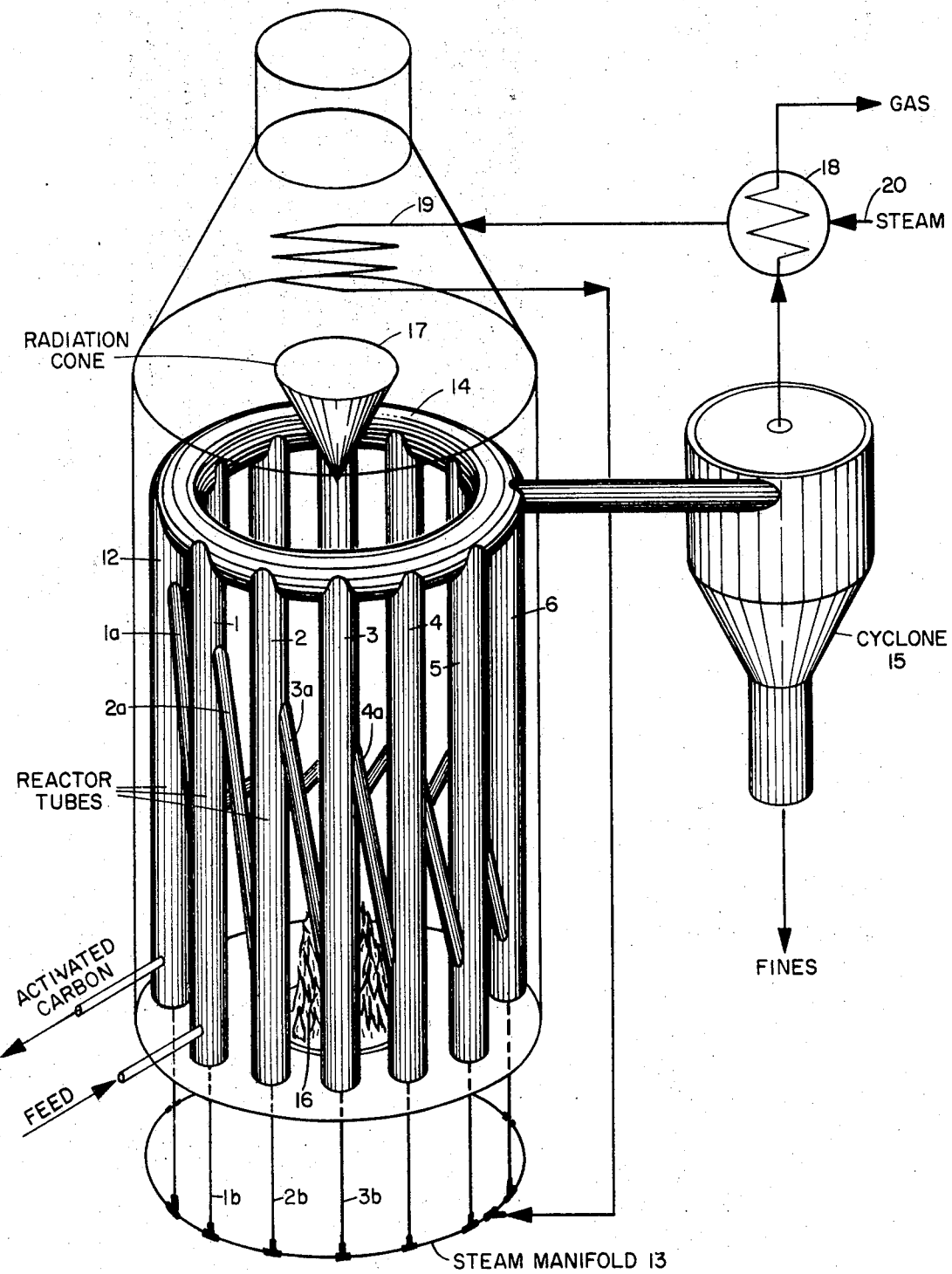

ABSTRACT OF THE DISCLOSURE

Activated carbon is prepared from carbonaceous material in a reactor having a plurality of stages arranged in series. The carbonaceous material fed to the reactor has a particle size range such that the activation gas, passed upwardly through each stage, maintains the material in a fluidized state. Material from the upper portion of each stage passes to the lower portion of the next stage through overflow means. In order to prevent backmixing, each successive stage is arranged with an overflow lower than the overflow of the preceding stage.

BACKGROUND

This invention relates to the preparation of activated carbon from carbonaceous material. More particularly, it relates to a method and apparatus for activating carbonaceous material in a reactor having a plurality of stages arranged in series and in which the carbonaceous material in the reactor is maintained in a fluid state by the activation gas.

In a single stage fluidized reactor there is thorough mixing of particles of various ages, i.e., various degrees of activation. In fluid state activation, however, backmixing has a doubly deleterious effect on product quality. Not only do the newly introduced particles mix causing part of them to be discharged from the reactor before they have been sufficiently activated, but their poor quality has a disproportionate effect since the particles which have been sufficiently activated have lost weight in the process. For example, if one takes iodine number as the product quality measurement and assumes that in the batch reactor the iodine number increases in an exponential decay function with burnup while burnup is linear with time, the average product quality expressed as a percentage of the batch quality is as follows. At 60 percent burnup, one stage gives 63%, two stages give 77%, three stages give 84%, ten stages give 94%, etc. At least 7 stages are needed to reach 90% of batch reactor quality. Similar results can be computed for other burnup levels.

SUMMARY OF THE INVENTION

This invention consists of method and apparatus for preparing activated carbon comprising the steps of:
 (a) Passing finely-divided carbonaceous material serially through a plurality of vertically-disposed activation zones, said material being passed from an overflow point in the upper portion of each zone to the lower portion of the next zone;
 (b) Heating said carbonaceous material by indirect heat exchange to a temperature such that activation of the material with a gaseous activating medium takes place;
 (c) Passing a gaseous activating medium through the material in each zone at a rate sufficient to maintain said material in a fluid state; and
 (d) Recovering activated carbon from the last of said zones.

An important feature of the invention involves the minimization of backmixing by providing that the overflow point of each zone is at an elevation lower than the overflow point of the preceding zone.

DESCRIPTION OF DRAWING

The drawing shows a preferred embodiment of the apparatus, i.e., the activation reactor.

DETAILED DESCRIPTION

The feed consisting of carbonaceous material is introduced into the lower portion of the first reactor stage or zone (tube 1), passes up through tube 1, overflows connecting tube 1a and passes downwardly to the lower portion of reactor tube 2. In like manner the material passes through each of the subsequent reactor zones (tubes 3, 4, 5, etc.), until it is discharged as activated carbon from the lower portion of the last reactor zone (tube 12). Activation gas is introduced into the bottom of each reactor tube, at such a rate as to maintain the carbonaceous material in a fluidized condition, through lines 1b, 2b, 3b, etc. interconnected to steam manifold 13. The off gases are collected in conduit 14 and passed to cyclone 15 for separation of fines from gas. As shown in the drawing, heat is supplied to the reactor, preferably by means of gas or liquid fired heating means 16. Radiation cone 17 is preferably included to provide for more efficient utilization of heat. Activation gas entering the system through line 20 is preferably heated through indirect heat exchange with the off gases in exchanger 18 and may be additionally heated in coil 19 at the top of the reactor prior to introduction into the manifold 13.

Backmixing is minimized by arranging the overflow conduits 1a, 2a, etc. so that the upper connection of each such overflow conduit is at an elevation lower than the upper connection to the preceding tube.

The carbonaceous material may be any material suitable for the preparation of activated carbon, e.g., non-caking coal; carbonized lignite; carbonized vegetable material such as coconut shells, pecan hulls, wood, fruit pits (such as apricot pits, peach pits, etc.); petroleum coke and bone char. Suitable activation in fluidization gases include oxygen, air, steam, carbon dioxide and mixtures thereof, although steam is preferred.

The carbonaceous material should be ground to a particle size of −6 U.S. standard mesh and preferably +20− 200 U.S. standard mesh in order that it may be fluidized within the reactor tubes.

Reactor temperatures of from 600° F.–2000° F. may be used, depending on the gas selected. The preferred temperature range for steam is 1400° F. to 1600° F.

The residence time in each zone or stage may be ten minutes to five hours, depending on the feedstock and the activation gas. For activation of coal with steam the preferred total residence time is at least 1.5 hours.

The fluidization velocity (based on empty cross section) may be 0.1–10 feet per second, depending on the particle size distribution.

The number of stages, i.e., the number of reactor tubes may vary from 3 to 50 although it is preferred to use from about 7–20 stages.

EXAMPLE

Listed in the table below is a preferred embodiment of the invention.

TABLE

Reactor conditions: 1500° F., 12 stages, cross-sectional area such that superficial gas rate is 1 ft./sec. Residence time per stage such that 67 wt. percent overall burnup of carbon is realized, about 1 hour.

Feed:
(1) 60 T/D of −30 +100 U.S. mesh delayed petroleum coke.
(2) 558 pound moles per hour of 300° F., 50 p.s.i.g. steam as activation and fluidization gas (heated to 1500° F. by exchange with stack gas and off gas before entering the reactor).
(3) Fuel sufficient to produce 25,000,000 B.t.u./hr. based on LHV.

Products:
(1) 20 tons per day of activated carbon.
(2) Off gas:

| Component: | Moles/hr. |
|---|---|
| Steam | 279 |
| CO | 49 |
| $CO_2$ | 110 |
| $CH_4$ | 5 |
| $H_2$ | 279 |
| Total | 722 |

What is considered new and inventive in the present invention is defined in the hereunto appended claims, it being understood, of course, that equivalents known to those skilled in the art are to be construed as within the scope and purview of the claims.

I claim:
1. A process for preparing activated carbon comprising the steps of:
  (a) Passing finely-divided carbonized material selected from the group consisting of noncaking coal, carbonized lignite, carbonized vegetable materials, petroleum coke and bone char serially through a plurality of vertically-disposed activation zones, said material being passed from an overflow point in the upper portion of each zone to the lower portion of the next zone wherein the overflow point of each zone is at an elevation lower than the overflow point of the preceding zone;
  (b) Heating said carbonized material by indirect heat exchange to a temperature such that activation of the material with a gaseous activating medium takes place;
  (c) Passing a gaseous activating medium selected from the group consisting of oxygen, air, steam, carbon dioxide and mixture thereof through the material in each zone at a rate sufficient to maintain said material in a fluid state; and
  (d) Recovering activated carbon from the last of said zones.

2. The process of claim 1 wherein the activation temperature is in the range of 600° F.–2000° F.; the residence time in each zone is from 10 minutes to 5 hours; the fluidization velocity is from 0.1–10 feet per second; the finely-divided carbonized material has a particle size of −6 U.S. standard mesh; and the number of said zones if from 3–50.

3. The process of claim 2 wherein the gaseous activation medium is steam; the activation temperature is about 1400–1600° F.; and the number of zones is from 7–20.

4. The process of claim 2 wherein the gaseous activation medium is steam; the activation temperature is about 1500° F.; the residence time in each zone is about 1 hour; the fluidization velocity is about 1 foot per second; the finely-divided carbonized material is delayed petroleum coke having a particle size distribution of 30 x 100 U.S. standard mesh; and the number of zones is 12.

5. The process of claim 3 wherein the carbonized material is noncaking coal.

References Cited

UNITED STATES PATENTS

| 1,641,053 | 8/1927 | Sauer | 252—421 |
| 2,631,159 | 3/1953 | Keith | 23—284X |
| 2,853,361 | 9/1958 | Bryk et al. | 23—284X |
| 3,184,397 | 5/1965 | Work et al. | 252—445 |

FOREIGN PATENTS

| 505,041 | 8/1954 | Canada | 201—31 |

DANIEL E. WYMAN, Primary Examiner

P. E. KONOPKA, Assistant Examiner

U.S. Cl. X.R.

23—284; 201—31; 202—121; 252—421